United States Patent [19]
Ridlen

[11] 3,871,177
[45] Mar. 18, 1975

[54] CONTROL DEVICE FOR A HYDROSTATIC TRANSMISSION

[76] Inventor: Charles W. Ridlen, 1261 Bon Air Ct., Decatur, Ill. 62521

[22] Filed: Feb. 7, 1974

[21] Appl. No.: 440,493

[52] U.S. Cl. .................... 60/431, 60/449, 60/465
[51] Int. Cl. ............................................. F15b 11/02
[58] Field of Search ............ 60/423, 427, 431, 433, 60/447, 449, 465

[56] References Cited
UNITED STATES PATENTS

| | | | |
|---|---|---|---|
| 3,054,263 | 9/1962 | Budzich et al. ........................ | 60/447 |
| 3,214,911 | 11/1965 | Kempson ........................... | 60/433 X |
| 3,284,999 | 11/1966 | Lease.................................... | 60/431 |
| 3,788,063 | 1/1974 | Kempson et al. ................... | 60/449 X |

*Primary Examiner*—Edgar W. Geoghegan
*Attorney, Agent, or Firm*—Hill, Gross, Simpson, Van Santen, Steadman, Chiara & Simpson

[57] ABSTRACT

A control device for varying the ratio of a hydrostatic transmission or torque converter in response to changes in the load and speed of the prime mover during the transmission. The device senses the load by sensing changes in the vacuum of the intake manifold and senses the speed by utilizing a gear pump driven by the prime mover with the output of the gear pump being modified to correspond to the power curve of the prime mover by either pressure relief means or use of a cam system. The sensed conditions of speed and load are utilized to provide a combined signal to operate a servo which makes adjustments in the ratio of the transmission. In several embodiments, the output of the combined signal is applied to a pilot spool of the servo device through a bar linkage which also is part of the throttle linkage so that changes in load and speed of the prime mover during operation will cause adjustments in the throttle setting.

20 Claims, 9 Drawing Figures

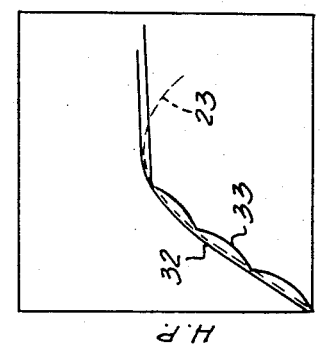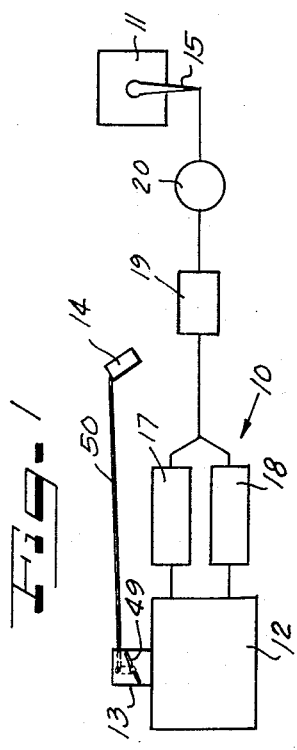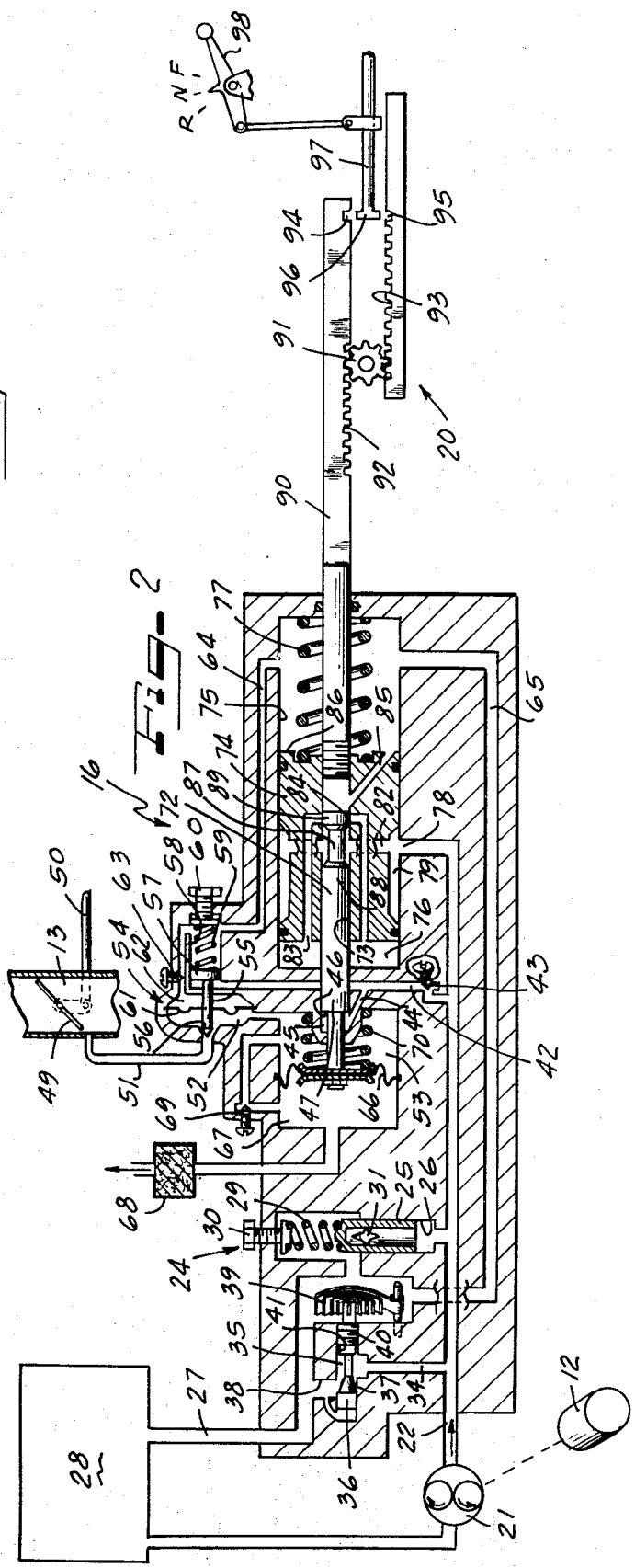

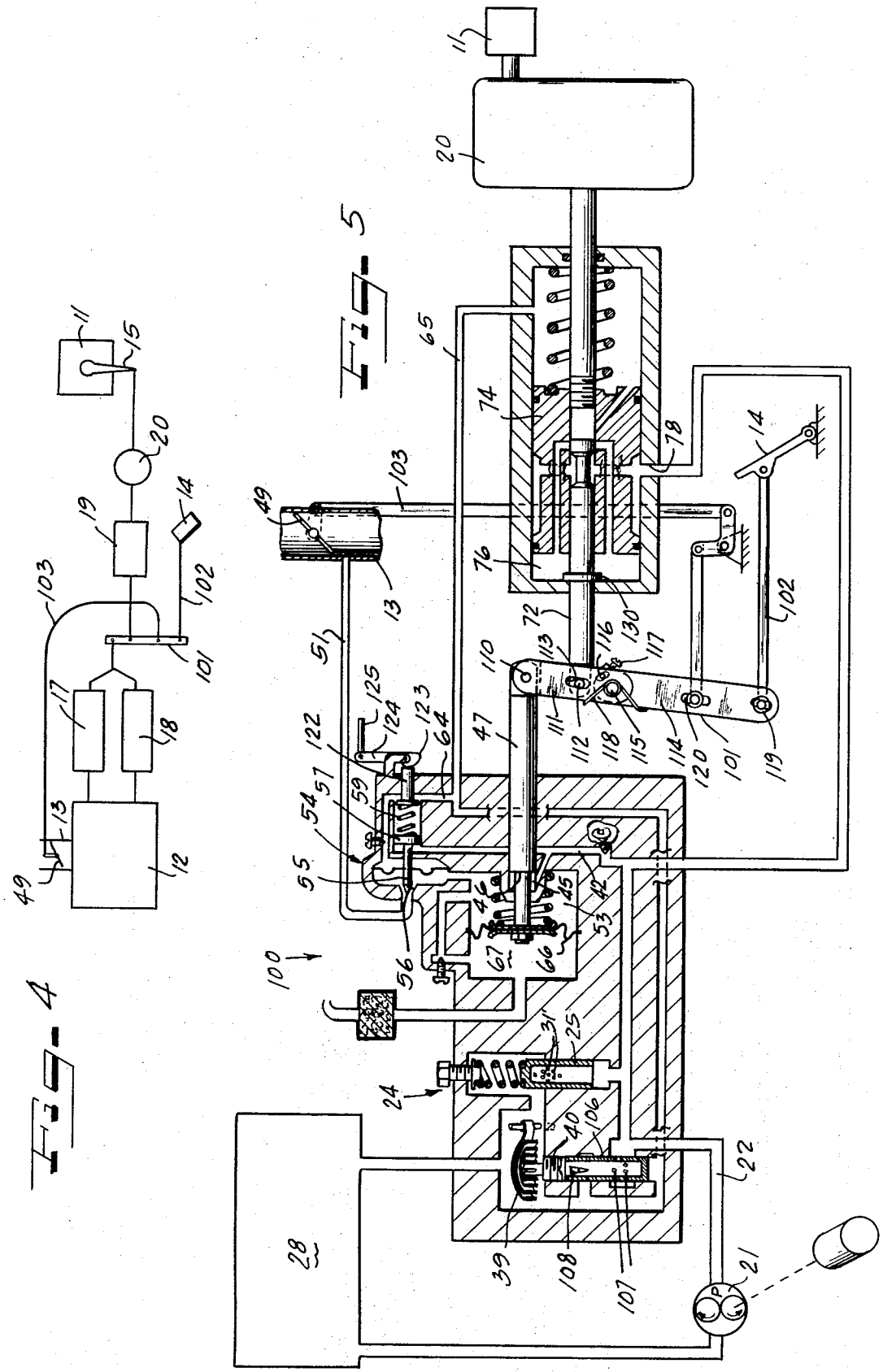

CONTROL DEVICE FOR A HYDROSTATIC TRANSMISSION

BACKGROUND OF THE INVENTION

1. Field of the Invention

The present invention is directed to a control device for varying the ratio of a hydrostatic transmission in response to sensed load and speed conditions of the prime mover.

2. Prior Art

In a hydrostatic transmission, torque converters and electric drives, a control system is necessary for the purpose of matching the ratio of the system to the power output of the prime mover and to adjust this ratio over a variable range in response to changes in the power output of the prime mover. In addition to the above, it is desirable to have a control system which will provide rapid shifting of the ratio during acceleration and deceleration of the prime mover.

In presently known control systems, to compensate for changes in the speed of the prime mover in the low speed range, the control system either utilizes devices for dumping fluid pressure in the drive system during acceleration or deceleration of the prime mover or relies upon a high degree of slippage in the system for changes in the speed of the prime mover.

Various control devices have been proposed, for example a control system disclosed in U.S. Pat. No. 3,069,856 which issued to Uher on Dec. 25, 1962. In this system, a gear pump provides a pressure, which is modified by a relief valve controlled by a governor attached to the prime mover, and is utilized in a servo system to change the setting of a torque converter. During increases in the engine speed, the pressure applied to the servo is increased to provide an increase in the ratio of the torque converter. One difficulty with such a system is that the governor utilized for measuring the speed does not provide an output pressure to the speed curve which follows the power curve for the engine and output of the governor is only a close approximation of the engine power curve. Another type of control system which utilizes a governor to produce a control pressure is disclosed in U.S. Pat. No. 3,139,723 which issued to Hollowell on July 7, 1964.

Another type of control device is disclosed in U.S. Pat. No. 3,054,263 which issued to Budzich et al on September 18, 1962 and uses a gear pump that is driven by the output shaft of the prime mover to produce a pressure. This pressure will vary in response to the speed of the prime mover and is passed through a venturi to provide a pressure differential which is utilized in controlling the ratio settings for the pump and possibly the motor of a hydrostatic transmission.

One device which attempts to adjust the output of a hydraulic transmission in response to the engine speed and load is disclosed in the U.S. Pat. No. 2,629,332 which issued to Tripp on Feb. 24, 1953. In the Tripp patent, the intake vacuum of the engine is sensed to determine load and the speed of the engine is measured by a governor. The output of the governor and load sensing device are utilized in changing the displacement of a variable displacement pump in a hydraulic transmission.

In each of the above examples, which are only examples of a wide variety of attempts at matching the ratio in a hydrostatic transmission or torque converter with engine speed and load, problems arise due to the fact that the output of the means for measuring the engine speed does not conform to the power curve. Furthermore many control systems are extremely complicated due to the multiplicity of valves, actuators and servos used in an attempt to match the power of the engine to the load in accordance with the power output characteristics of the engine. Thus such control systems are difficult to maintain in a correct working order and are expensive to repair.

SUMMARY OF THE INVENTION

The present invention provides a control device for a hydrostatic transmission, or torque converter which varies the power ratio of the transmission or torque converter in response to measured load and speed conditions of the engine or prime mover. The control device accomplishes this by utilizing a pump driven by the prime mover or engine to produce a hydraulic pressure which is modified for pressure changes due to changes in the speed of the prime mover to follow a curve substantially the same as the engine power curve and by measuring the load preferably by measuring the vacuum at the intake manifold to produce two signals which are utilized to drive a pilot spool for a servo piston which piston makes the necessary adjustment in the transmission. In the preferred embodiment, the output of the sensed speed and load signals is applied through a lever bar or linkage to either the pilot spool or linkage connected to the pilot spool and the lever or bar is also part of the linkage between the throttle valve at the intake manifold and the manually operated throttle so that changes in the throttle setting will influence the position of the pilot spool and changes in load and speed readings will cause change and variations in the throttle setting.

Accordingly, it is the object of the present invention to provide a control device for providing infinitely variable power ratios for a hydrostatic transmission or torque converter.

Another object of the present invention is to control the power ratio of a hydrostatic transmission in response to both the load on the prime mover and the speed of the prime mover and to provide rapid acceleration of the prime mover by instant shift back in the ratio proportional to the change in the throttle setting.

Yet another object of the present invention is to provide economical operation of the prime mover by providing a proper ratio in the hydrostatic transmission or torque converter for a given load and engine speed.

A still further object of the present invention is to provide a control system enabling a gradual acceleration and deceleration without dumping pressure from the transmission system.

Other objects, features and advantages of the invention will be readily apparent from the following description of the preferred embodiments thereof taken in conjunction with the accompanying drawings although variations and modifications may be effected without departing from the spirit and scope of the novel concepts of the disclosure.

BRIEF DESCRIPTION OF THE DRAWINGS

FIG. 1 is a block diagram of an embodiment of the present invention for a prime mover driving a hydrostatic transmission or torque converter;

FIG. 2 is a diagrammatic cross-sectional view of the embodiment of the control device of FIG. 1;

FIG. 3 is a graphical presentation of pressure to RPM curves and horsepower to RPM curves;

FIG. 4 is a block diagram of a second embodiment of the present invention for controlling a hydrostatic transmission or torque converter driven by a prime mover;

FIG. 5 is a diagrammatic cross-sectional view of a control device of the embodiment illustrated in FIG. 4 with portions in elevation;

FIG. 8 is a block diagram of a third embodiment of a control device of the present invention for controlling a hydrostatic transmission or torque converter driven by a prime mover; and FIG. 9 is a diagrammatic cross-sectional view of a control device utilized in FIG. 8.

DESCRIPTION OF THE PREFERRED EMBODIMENTS

Figure 7:
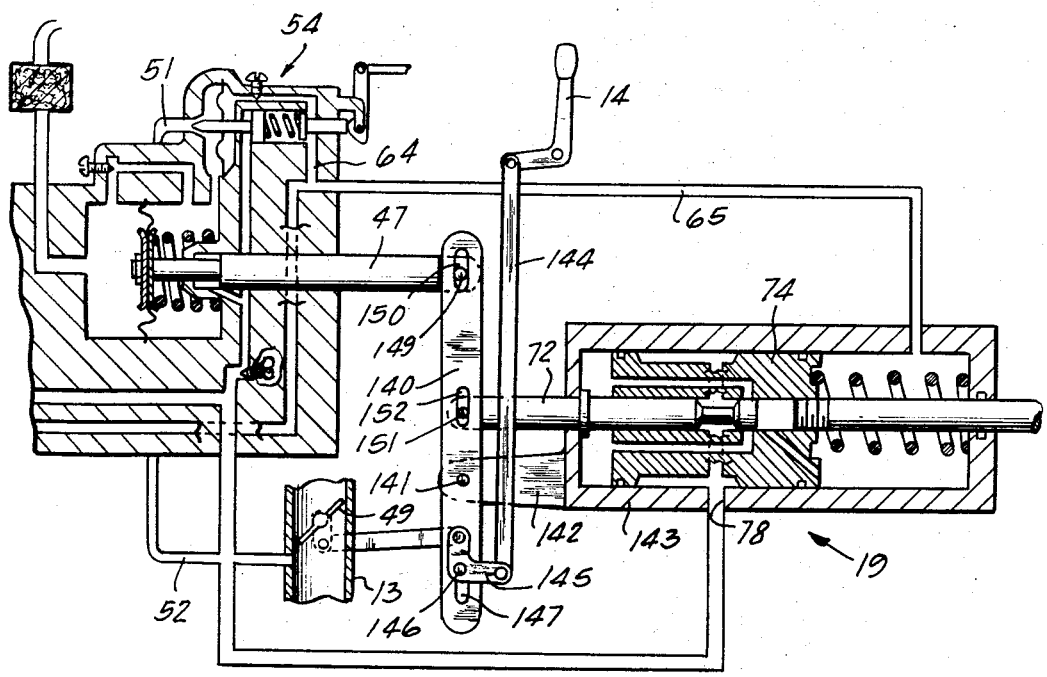
FIG. 7 is a diagrammatic cross-sectional view of a modification of the control device illustrated in FIG. 4 with portions in elevation.

The principles of the present invention are particularly useful in a hydrostatic transmission or torque converter drive system generally indicated at 10 in FIG. 1 which includes a hydrostatic transmission or torque converter 11 which is driven by a prime mover or engine 12 through a drive shaft not illustrated. The prime mover 12, which is an internal combustion engine of the Otto type, has an intake manifold 13 which is in communication with a carburetor having a throttle valve 49 which valve is connected by linkage 50 to an operator or manually actuated throttle 14 such as a foot accelerator or a hand throttle. The hydrostatic transmission or torque converter 11 may comprise a variable displacement pump which is driven by the prime mover or engine 12 to produce a supply of hydraulic fluid under pressure for driving a hydraulic motor. To change the ratio in the transmission 11, the displacement of the pump can be changed by a control lever 15.

The control device generally indicated at 16 (FIG. 2) includes first means 17 (FIG. 1) for sensing the load on the prime mover 12 and second means 18 for sensing the speed. The output signals of the means 17 and 18 are combined and delivered to a servo device 19 which is included in the housing of device 16 and whose output may be connected either directly to the lever 15 of the transmission 11 or through a manually controlled reversing device 20 which enables both a forward and reverse output for the transmission 11.

The second means 18 for sensing the speed of the prime mover 12, as illustrated in FIG. 2, utilizes pump means 21 driven by the prime mover 12 which pump means is illustrated as a gear pump. The discharge of the gear pump 21 is received by a passageway or conduit 22 and will have a pressure which will increase as the speed of the prime mover 12 increases. The change in the discharge pressure of the pump 21 is substantially proportional to a square of the change of speed of the pump 21. To modify the pressure in conduit 22 to follow the power curve of the prime mover 12 as illustrated at 23 in FIG. 3, the sensing means 18 includes a compensating means generally indicated at 24 in FIG. 2. The compensating means 24 includes a cup-shaped piston 25 received in a cylinder 26 which is in communication with conduit 22 and has a port in communication with a return line 27 for sump 28 which supplies fluid for pump 21. The cup-shaped piston 25 is biased by the pressure in the conduit or passageway 22 against a spring 29 whose spring force can be adjusted by a threaded adjustment 30. The piston 25 has bleed means such as a bleed orifice 31 for bleeding pressure from the conduit 22 through the piston 25 to the return line 27. As illustrated, the orifice or aperture 31 has a configuration to change the effective orifice size in relationship to the amount of displacement of the piston 25 against the spring 29. As the pressure in the cylinder 26 increases, the portion of the orifice 31 exposed for bleeding hydraulic pressure to the sump 28 increases. The orifice 31 is selected to have a variable configuration to modify the output pressure of pump 21 to follow a pressure verses RPM (speed) curve such as 32 (FIG. 3) which is substantially the same configuration as the power curve 23 up to the point of maximum power for the engine 12.

In the embodiment illustrated in FIG. 2, the orifice 31 is a single orifice having a substantially star-shape to enable increasing the size of the effective area of the bleed orifice with displacement of the piston 25 to enable the necessary bleeding of the pressure to convert the normal output of the pump 21 to a modified pressure which follows the curve 32. In the embodiment of FIG. 5, the piston 25 has a series of apertures or orifices 31' with the pattern of orifices providing the desired change of effective area for the bleed means to produce the desired modified pressure having the pressureRPM curve 32. Another possibility is a series of relief valves each set to open a bleed orifice at a different, predetermined pressure. As the output pressure in conduit 22 increases more relief valves will open to produce a modified pressure having a pressure-RPM curve such as illustrated in FIG. 3 at 33.

To obtain the desired area for the bleed means and the location on the piston wall, the effective orifice opening for a given output pressure of the pump 21 to convert it to the desired modified pressure can be determined. The displacement of the piston 25 against spring 29 for the output pressure can also be measured. With this information, the orifice 31 or plurality of orifices 31' can be located in the wall of piston 25 and a final adjustment in the force of the spring 29 be made by adjustment means 30 to make the modified pressure follow curve 32. While different engines or prime movers, and gear pumps will vary in their power curve and output pressure respectively, the combination of a certain model engine and model of a gear pump will be sufficiently similar to a like combination that the final adjustment in spring pressure of spring 29 will enable the final matching of the curve for modified pressure to the power curve.

To maintain the modified pressure on the curve 32, it is desirable that the temperature of the hydraulic fluid in the system remain constant to remove any deviations in pressure due to change in the viscosity of the fluid due to temperature. While it is possible to cool the hydraulic fluid to maintain it at a given temperature or within a given temperature range, it is also possible to provide a compensating means which is temperature responsive to bleed or change the pressure in response to temperature change. As illustrated, this means includes a passageway 34 extending from the conduit 22 to a cylinder 35 which receives a piston 36 having a sculptured or tapered surface 37. The piston 36 is shifted with respect to a port 38 connected to the return line 27 to the sump 28 by a temperature sensing device 39. As illustrated the device 39 is a bimetallic spring disposed in the return line and rotates a threaded shaft 40 in a threaded bore 41 in response to changes in the temperature of the hydraulic fluid. As the temperature increases the piston 36 is shifted to decrease the size of the effective opening between the cylinder 35 and the port 38 to allow a lesser amount of fluid pressure to be bled to the sump 28.

The hydraulic fluid with the modified pressure is passed into a passageway 42 having a restricted orifice 43 which is adjustable. The passageway 42 is conducted through a second passageway 44 into a pressure chamber 45 to act on a pressure surface of a piston 46 which is a surface on a member 47 of a means for combining the sensed signals of the speed sensing and load sensing means.

Although various means can be utilized for sensing the load on the prime mover 12, the device 16 senses the changes in the load on the engine 12 by means for sensing changes in the vacuum pressure in the intake manifold 13 or in the vacuum pressure of the intake system of the engine which is connected to the manifold on the engine side of the throttle valve or butterfly valve 49 of the carburetor which intake system has essentially the same vacuum pressure as the intake manifold. When an engine is at idle, the vacuum at the intake manifold is at a high value. During acceleration which causes loading of the engine, the vacuum at the manifold will drop. As the engine reaches the desired speed for the setting of the throttle valve 49, the vacuum will increase to a level for the throttle setting which level is below the idle value. If the load on the engine increases, the vacuum will decrease from the level and if the load decreases, the vacuum will increase above the level and perhaps above the idle value.

To sense the vacuum in the manifold 13, a conduit 51 extends from any place in the intake system on the engine side of the butterfly valve 49 to a first pressure chamber 52 which is connected to a second pressure chamber 53 and is provided with a valve generally indicated at 54 to control flow or the application of the vacuum to the pressure chamber. The valve 54 has a valve member 55 cooperating with a seat 56 formed at the connection of conduit 51 with the pressure chamber 52 and is attached to actuating means which include a piston 57 received in a cylinder 58. A resilient means such as a spring 59 biases the piston 57 to seat the valve member 55 on the seat 56 and the spring 59 can have its force adjusted by a threaded adjustment means 60. The first pressure chamber 52 is formed by a diaphragm 61 extending between the stem of valve member 55 and an enlarged cavity and the diaphragm 61 also forms a chamber 62 which catches any leakage of fluid from the cylinder 58 and prevents it from entering either pressure chambers 52, 53 or from being drawn into the intake manifold. To open the valve 54, the fluid pressure in passageway 42 acts on the piston 57 and moves it against the pressure of the spring 59 and any vacuum in chamber 52. The chamber 62, which prevents leakage of hydraulic pressure along the valve stem into the pressure chambers 52 and 53 is in communication through a restricted orifice 63 to a return line 64 which is in communication with a return line 65 for the sump 28. Fluid entrapped by the diaphragm 61 in chamber 62 tends to dampen the valve action which is desirable.

The second pressure chamber 53 is formed by a diaphragm 66 within an enlarged chamber so that a third pressure chamber 67 is provided. The chamber 67 is vented to atmosphere through a filter such as 68 and is in communication with the second chamber 53 through a restricted orifice 69 which can be adjusted. Thus when the valve 54 is closed, the pressure in chambers 52, 53 and 67 are equal.

Except during idle condition for the engine when valve 54 is closed, changes in the load on the engine 12 will cause changes in the vacuum at intake manifold 13 and thus in chamber 53. Since the diaphragm 66 will be displaced by the different values of the pressures in chambers 53 and 67, a change in vacuum will change the pressure differential acting on the diaphragm.

To combine the output signal of the load sensing means with the output signal of the speed sensing means, the device 16 includes a means for combining the two signals into a single signal. The member 47 which is part of the means for combining is attached to the diaphragm 66 and is displaced against a spring 70 in response to displacement of the diaphragm due to an increase in the vacuum pressure in the chamber 53. Since the modified pressure from the gear pump 21 acts on piston 46 which is provided on member 47, the member 47 is also displaced in response to the sensed speed and provides a displacement signal which is in response to the combined displacement against the spring 70 which is proportional to the sensed load and speed of the prime mover.

As illustrated the member 47 is directly connected to a pilot spool 72 which is received in an axial bore 73 of a servo piston 74 which is disposed in a cylinder 75 of a housing of the servo unit 19 to form a pressure chamber 76. At the opposite end of the cylinder 75, a spring 77 biases the servo piston 74 to decrease the size of the pressure chamber 76. As illustrated, the right-hand side of the cylinder 75 interconnects conduit 64 and the return line 65. To supply pressure to the servo system, the conduit 22 has a port 78 in the wall of cylinder 75 which port is in communication with an annular groove 79 on the servo piston 74. The piston 74 has radial bores 82 which interconnect the annular groove 79 to the axial bore 73 and the piston has passages 83 connecting the pressure chamber 76 to a port 84 in the axial bore 73 which port is spaced from bore 82. The piston also has a passage 85 extending between the axial bore 73 and an end surface 86. The pilot spool 72 has an annular groove 87 which forms lands 88 and 89 and is of a sufficient axial width to interconnect the port 84 with the ports formed by the bores 82 when the pilot spool 72 is in the desired axial position within the piston 74.

The piston 74 is connected to a rod 90 which extends from the housing for transmitting the piston displacement. The rod 90 may be directly linked to the lever 15 of transmission 11 or through a direction control device 20 to the lever 15 of the transmission. As illustrated, the direction control device 20 utilizes a pinion gear 91 operating with a pair of rack gears 92 and 93 with the rack 92 being disposed on the rod 90. The rack 92 has a notch 94 and the rack 93 has a notch 95 and each notch can receive a pawl 96 on a rod 97 to connect the rod 97 to either the rack 92 or 93. To selectively engage the pawl 96 with either notch 94 or 95, the rod 97 is connected to a manually actuated lever 98 of a direction selection device 20. When a forward direction is selected, the rack 92 is connected to rod 97 to directly transfer the movement of the servo piston 74 to the transmission lever 15. When a reverse direction is selected, the movement of the piston 74 is transferred through the pinion gear 91 to rack gear 93 which is moved in a reversed direction and connected to the rod 97. As illustrated, when the direction selection means is in a neutral position, the rod 97 is disengaged from both the rack gears 92 and 93. It should be pointed out that a change in the direction can only be accomplished when the prime mover 12 is in an idle condition at which condition the notches 94 and 95 are aligned with the pawl 96.

As illustrated the control device 16 is in the position it would assume when the prime mover 12 is in an idle condition. The servo piston 74 has returned the lever 15 of the transmission 11 to a position where no displacement of the pump would occur.

When the operator depresses the accelerator 14 or adjust the hand throttle to increase the speed of the prime mover 12, the butterfly valve 49 is shifted to an open position to cause a decrease in the level of the vacuum in the intake manifold 13. At the same instance the engine will tend to speed up causing an increase in the output pressure of gear pump 21 which pressure is modified by the compensating means 24 and is applied against the piston 46 on the member 47 and against the piston 57 of the actuating means for the valve member 55. As the pressure increases, the valve member 55 will be withdrawn from the seat 56 to communicate the conduit 51 to the pressure chambers 52, 53 and cause the evacuation thereof. The evacuation of chamber 52 resists movement of the piston 57. Prior to opening the valve 54, pressure in the chamber 53 and 67 were substantially equal due to the restricted orifice 69. With the pressure differential established between the chambers 67, 53 by the opening of the valve 54, a pressure is applied against the rod member 47 along with the pressure in the chamber 45 to give a combined signal to the pilot spool 72 to cause it to shift relatively in the bore 73 of the servo piston 74. With the shifting of the spool 72, the port 84 of passage 83 is in communication with the pressure ports 82 to apply the fluid under pressure to the pressure chamber 76 to cause shifting of the servo piston 74 against the spring 77 to make an adjustment in the ratio of the transmission such as 11. As the engine or prime mover 12 reaches its speed or RPM for a given throttle setting, movement of the member 47 will cease and the servo piston 74 will continue to move until the relative movement with the pilot spool 72 causes land 89 to block flow between bore 82 and port 84. If the pressure in chamber 76 causes further movement of the piston 74 against the spring 77, the land 89 of the pilot spool 72 will open port 84 to be vented through passage 85 to return line 65. The venting will stop when the spring 77 shifts the piston relative to the spool 72 until land 89 closes port 84. Thus, the servo piston 74 will assume an equilibrium point for a given position of the pilot spool 72.

Assuming that the engine 12 is at the desired speed for the throttle valve 49 setting and that the control device 16 has the transmission 11 at the correct ratio for the given speed and load for the prime mover, any changes in load will cause a slight change in the transmission ratio. For example, if the vehicle goes down a slight incline, the load will decrease on the engine 12 causing an increase in manifold vacuum and speed. The control device 16 will sense these changes applying an increased pressure on piston 46 and an increased pressure differential on diaphragm 66 to cause movement of the pilot spool 72 to cause servo piston 74 to shift to decrease the transmission ratio. In a similar manner, a slight increase in the load due to going up an incline will cause a decrease in vacuum in the intake manifold 13 and slight drop in engine speed. These two sensed changes in condition cause the servo device 19 to increase the transmission ratio.

When the speed of the prime mover is decreased by returning the throttle setting to a lower throttle setting or to idle, the control device 16 will shift the transmission ratio to follow the changes in throttle setting as the engine slows. When the throttle for the engine 12 is decreased, the engine speed decreases and thus the modified pressure from pump 21 decreases. With the decreased engine speed, the load on the engine is reduced to cause an increase in the vacuum level at the intake manifold and a reduction in the output pressure from the pump 21 in line 42 which pressure is applied to pistons 46 and 57. The pressure reduction on piston 46 causes the pilot spool 72 to shift to the left (FIG. 2) to vent pressure chamber 76 to the return line 65 and allow the servo piston 74 to move to increase the ratio of the transmission. However with the increased manifold vacuum level, the pressure differential acting on diaphragm 66 is increased to retard or oppose the movement of the pilot spool towards the venting position. Thus the increased pressure differential retards or opposes the shift down of the transmission and prevents excessive engine braking which causes excessive wear and fuel consumption. With the decreased pressure in line 42 acting on piston 57, the valve 54 moves towards a closed position to decrease the rate of evacuation of the chambers 52 and 53, which allows the pressure differential acting on diaphragm 66 to decrease. With the decreasing of the pressure differential on the diaphragm 66, the pilot spool 72 continues to move to a position to vent the chamber 76 and allow movement of the servo piston 74 to further down shift the transmission. Thus when the engine speed is decreased, the pressure differential on the diaphragm 66 and the pressure on the piston 46 coact to decrease the rate of shift down of the transmission and increase the time required for complete shift down to reduce excessive engine braking.

When the engine speed is increased, the pressure in line 42 increases due to the increased output pressure of pump 21, however the vacuum level in the intake manifold is reduced. Thus while the pressure on piston 46 acts to decrease the transmission ratio or cause a shift up, the reduction in the vacuum level of the intake manifold causes a reduction in the pressure differential applied to diaphragm 66 which reduction initially opposes or retards the shift up. Thus as in the case of the shift down, the shift up is spread over a greater time interval and reduces excessive loads on the engine.

The coaction of the differential pressure on diaphragm 66 and the pressure on piston 46 also provides a smooth start from a standing or stop position with the engine at idle speeds to a drive range of speed. When the engine is at idle, the value 54 is closed and chambers 52 and 53 will be at substantially the same pressure as chamber 67 and the transmission will be in a neutral position. Since the transmission is in neutral, the engine during initial acceleration from an idle condition is substantially under a no load condition and will rapidly increase in speed which is sensed by pump means 21 which provides pressure in line 42. As the pressure on piston 57 initially opens valve 54, the chamber 52 is rapidly evacuated and opposes or retards further opening of the valve so that chamber 53 is initially unaffected and the pressures in chambers 53 and 67 remain initially equal. Thus the lack of a pressure differential retards shifting of the transmission by the piston 46 and the engine is gradually loaded without sudden jerks. As the engine continues to accelerate to the throttle speed setting, the piston 57 continues to open the valve 54 and the pressure differential is created to act in conjunction with the pressure on piston 46 to determine the transmission setting. Due to the diaphragm 61, the creation of the pressure differential and its effect on the transmission setting is delayed so that a smooth start from a standing position is accomplished.

Since it would be desirable to also change the throttle setting in response to changes in load and to obtain a quicker shift down of the transmission ratio during acceleration, a preferred embodiment of the control device of the present invention is illustrated in box form in FIG. 4 and the specific control device 100 is shown in FIG. 5. The control device 100 utilizes a load sensing means 17 and speed sensing or RPM sensing means 18 whose combined signal is applied to a lever or bar 101 which provides a linkage between member 47 and the pilot spool 72. In addition thereto, the hand throttle or foot accelerator 14 is connected by a link 102 to the same bar 101 and then further linkage illustrated as 103 is connected from the bar to the butterfly valve 49 of the carburetor for the intake manifold 13.

Referring to FIG. 5, the same element numbers are utilized to identify the same parts. However certain portions have been modified to show other devices capable of performing the desired functions. For example, the compensating means 24 utilizes a cup-shaped piston 25 which is provided with a plurality of tiny orifices 31' to produce the variable effective area of the bleed orifice instead of the single diamond-shaped orifice 31 of the preceding embodiment. Another minor variation is in the temperature compensating unit which uses a cup member 106 shifted by the threaded device 40 in response to expansion and contraction of the bimetallic temperature sensing element 39. The cup member 106 has a plurality of openings 107 to admit fluid under pressure into the interior of the cup and a triangular-shaped orifice 108 for bleeding fluid into the return line to the sump 28. Depending on the displacement of the cup member 106 the area of the orifice 108 is changed.

As mentioned above, the member 47 which transmits the combined sensed signal for load and speed of the prime mover 12 is pivotally connected at 110 to a first portion or section 111 of the bar or lever 101. The pilot spool 72 is also pivotally connected by a pin 112 in an elongated slot 113 in the section 111. A second section or portion 114 is pivotally connected at 115 to the first portion 111 and is interconnected by a lost motion connection 116 to enable an angular or pivotal movement of the two sections from a straight line arrangement to a second position with the portion 114 pivoted clockwise to the portion 111 within a desired angular range which may be adjusted by a screw 117. Spring means 118 are provided to urge the two sections 114 and 111 into the substantially straight line arrangement. The section 114 has a pair of spaced apertures 119 and 120 both of which may be elongated with the aperture 119 receiving an adjustable connecting pin of the linkage 102 from the hand throttle or foot accelerator 14 and the aperture 120 pivotally receiving an adjustable connecting pin for pivotal connection to the linkage 103.

Figure 6:
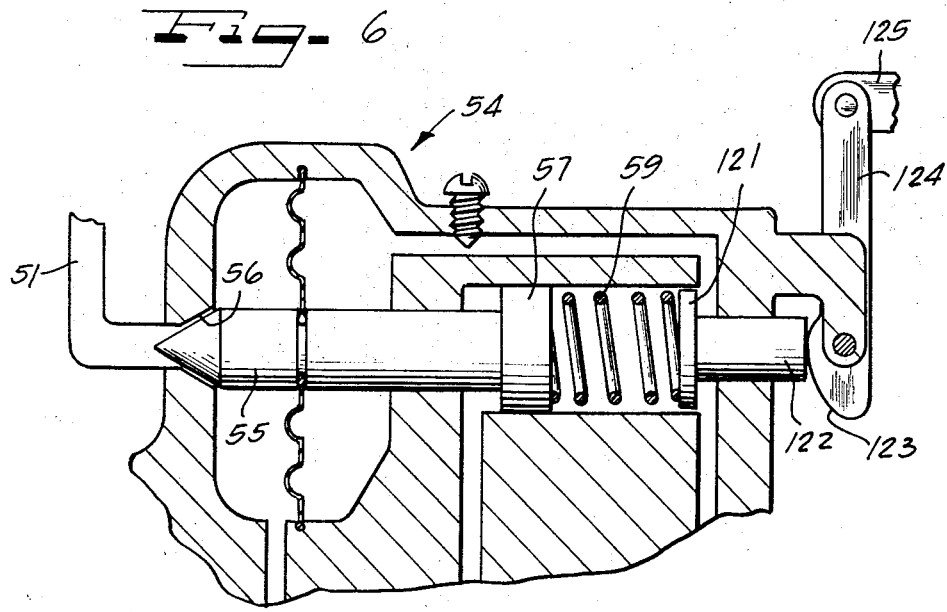
FIG. 6 is an enlarged cross-sectional view of a valve of FIG. 5.

While the valve 54 can utilize a threaded adjustment 60 for the spring 59, as illustrated in the embodiment of FIG. 2, it has been found that a variable adjustment of the pressure of spring 59 is desirable. The embodiment of FIG. 5, as best illustrated in FIG. 6, includes a plate member 121 attached to a plunger 122 which bears on a cam surface 123. The cam surface is provided with a lever 124 which is connected by linkage 125 to either the foot or hand throttle to pivot the cam as the prime mover is accelerated. The purpose of the cam is to change the pressure of spring 59 by shifting the plunger 122 and plate 121 to the left when the prime mover is at an idle condition to insure a positive closure of the valve member 55 on the valve seat 56. When the throttle accelerates the prime mover to a speed above idle speed, the linkage 125 and lever 124 pivots the cam surface 123 to allow the plunger 121 and its plate base 121 to shift to the right to reduce the spring pressure of spring 59.

Due to the interposing of the link or bar 101 between the member 47 and the pilot spool 72, the housing containing the servo device 19 and the housing containing the sensing means 17 and 18 are separated. The return lines 64 and 65 and the pressure line to port 78 have a different configuration. For example line 64 is directly connected to line 65.

The control device 100 as illustrated is positioned for the prime mover 12, being at idle with the pilot spool 72 and servo piston 74 withdrawn to the left. The pilot spool 72 is provided with a stop 130 to limit its movement to the left.

When the prime mover 12 is accelerated by the pressing of pedal or lever 14, the second section or portion 114 pivots at 115 in a clockwise direction to transfer the movement of the link 102 to the linkage 103 to open the butterfly valve 49 of the carburetor for the intake manifold 13. If the pilot spool 72 is not already withdrawn against the stop 130, it is pulled to the left with the amount of movement being limited by the stop engaging the wall. As the engine 12 increases in speed, the member 47 is shifted to the right (as viewed in FIG. 5) due to the combined output signal sensed by the means 17 and 18. As the member 47 moves to the right, it pivots the first portion 111 in a clockwise direction to return the sections 111 and 114 to a straight line arrangement and to shift the pilot spool 72 of the servo device. As in the previous embodiment, movement of the pilot spool 72 causes the servo piston 74 to move to create an output which changes the ratio of the transmission 11.

After the prime mover 12 has reached the desired speed for the throttle setting, changes in the load will cause variation and changes in the transmission ratio setting due to the movement of the member 47 which moves the pilot spool 72 relative to the servo piston 74. The bar or lever 101 after the initial setting for the throttle by the hand actuated throttle 14 tends to pivot around the point 119 so that any movement in the member 47 besides adjusting the ratio of the transmission makes a slight adjustment in the setting of the butterfly valve 49 due to movement in the linkage 103. This results in a higher economy and fuel utilization during any decrease in load on the system.

Unlike the device 16, the control device 100 while descending an incline will throttle back the engine 12 as it adjusts the transmission ratio. In a similar manner, when the load increases due to climbing of an incline, the control device 100 will increase the throttle setting to provide more power for the increased load.

When the position of the lever or pedal 114 is changed to reduce the speed of the engine 12, the section or portion 114 pivots at 110 in a counterclockwise direction to immediately change the setting of the butterfly valve 49 and shift the pilot spool 72 to momentarily up shift the transmission. With such change, the increase in load causes a drop in the vacuum in the chamber 53 to decrease the pressure differential on diaphragm 66 and decreases the output of the gear pump 21. The changes in the output signals of the load and speed sensing means will shift member 47 to the left to shift the pilot spool 72 to vent the pressure chamber 76 to shift the servo piston 74 to the left to cause a shift down of the transmission.

It should be pointed out, that the spring means 118 interconnecting the sections 111 and 114 enable yielding between the two sections when a manual increase is made in the throttle setting via the linkage 102. However, section 111 will attempt to return to a straight line arrangement as the member 47 shifts the upper section 111.

Another slight different embodiment of the bar arrangement illustrated in FIG. 5 is shown in FIG. 7. In this arrangement the bar or lever 140 is rigid and is pivotally mounted at 141 to a rigid support 142 which may be attached to a housing such as 143 containing the servo unit 19. A hand throttle 14 is connected through a linkage 144 to the butterfly valve 49 of the carburetor for the intake manifold 13. The linkage 144 has a link 145 which is pivotally supported at 146 by an adjustable mounting in an elongated slot 147 in the bar 140. As in the preceding embodiment, the member 47 is pivotally connected to the bar or lever 140 by a pin 149 received in an elongated slot 150 and the pilot spool 72 is connected by a pin 151 in an elongated slot 152.

In operation, movement of the handle 14 in a counterclockwise direction causes opening of the butterfly 49. It does not affect or change the position of the lever or bar 140 on its pivot point 141. As the prime mover or engine 12 speeds up, the sensing means 17 and 18 produce signals which are combined and applied through the member 47 to the bar 140 to shift the pilot spool 72. As the bar or lever 140 pivots, it will also slightly change or vary the setting of the butterfly valve 49 due to changing the position of the pivot point 146 in relationship to the butterfly valve 49.

During deceleration, movement of the handle 14 in the clockwise direction will cause closing of the butterfly valve 49 without shifting the bar 140. With the decrease in the speed of the prime mover 12, the member 47 will shift to the left and pivot the bar 140 on the point 141 in a counterclockwise direction to cause withdrawal of the pilot spool 72 which causes the servo piston 74 to shift to the left. As the bar 140 rotates, the pivot point for pin 146 is moved to cause a slight opening of the butterfly valve 49. Thus for a given setting of the handle 14, the engine speed and transmission ratio are selected to produce an approximate given ground speed. Variations in the load due to inclines and declines will cause increases and decreases in the engine speed and changes in the transmission ratio so that the ground speed will remain substantially constant for the handle setting.

Figures 8, 9:
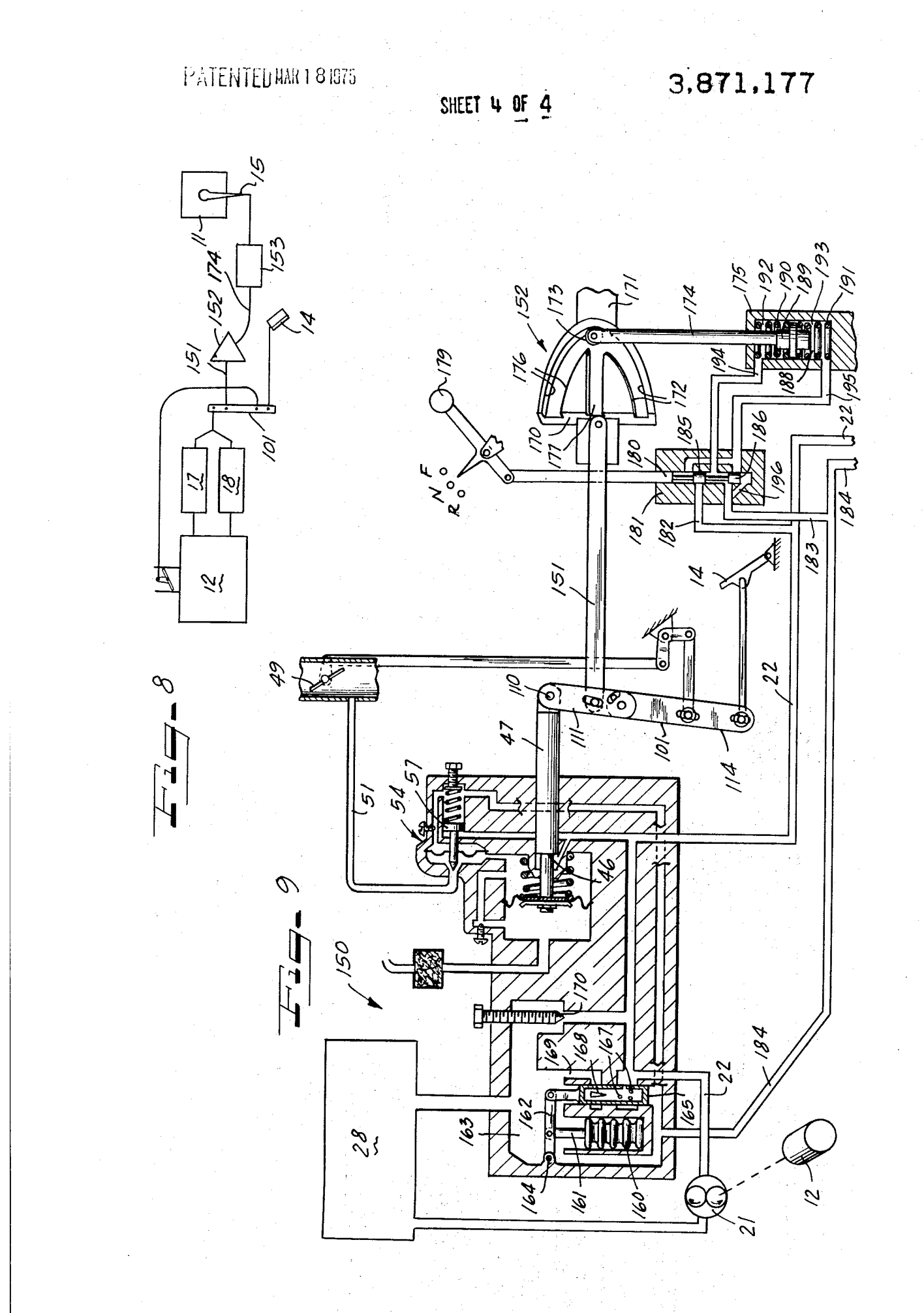

Another embodiment of a control device is illustrated in blocked diagrams in FIG. 8 with the control device 150 being illustrated in greater detail in FIG. 8. The control device 150 has the load sensing means 17 and a speed sensing 18 whose combined output is applied to the bar 101. The bar 101 is connected by a rod 151 to a combination compensating means and reversing cam means 152. The output of means 152 is applied to the servo unit 153 whose servo piston is directly connected to the lever 15 of the transmission 11.

As best illustrated in FIG. 9, the gear pump 21 which is driven by the prime mover 12 discharges into line 22 which is in communication with a temperature compensating means utilizing a bellows 160 filled with a fluid. The bellows 160 has a plunger 161 operating on a lever 162 which has one end pivotally mounted in a cavity 163 at a point 164. Attached to the lever 162 is a hollow sleeve 165 having a plurality of orifices 167 for admitting the fluid under pressure into the sleeve and a triangular-shaped orifice 168 which bleeds fluid from the interior of the sleeve 165 into a return line 169 for sump 28. As the temperature in line 22 increases, the fluid expands in the bellows 160 to displace the sleeve 165 to decrease the effective opening of the bleed orifice to allow a lesser discharge of hydraulic pressure to provide compensation for increases in the temperature of the fluid.

The passageway 22 also has an adjustable bleed orifice 170 which is adjusted to have a constant size. Thus the pressure applied against the piston 57 of the valve 54 and the piston 46 of the member 47 is not compensated to have a pressure versus RPM curve such as the curves 32 or 33 as illustrated in FIG. 3.

Movement of the member 47 is transferred to the bar or lever 101 and particularly to the first portion 111. Spaced from the pivotal connection 110, a member or rod 151 is connected to the section 111 to transfer pivotal movement of the bar 101 to the compensating means 152. As the increased pressure causes movement of the member 47 to pivot the section 111 and the bar 101 in a clockwise direction, the rod 151 shifts a cam member 170 on a slide 171. As illustrated, the cam 170 has double acting cam surfaces 172, which receive a follower such as a roller 173 which is connected on a follower rod 174. The follower rod 174 is connected by an adjustable connection 175 to the pilot spool (not illustrated) for the servo device 153. The purpose of the cam means 152 is to convert a displacement caused by the uncompensated pressure of the gear pump 21 into a modified or compensated displacement. The cam surface 172 of the cam means 152 are produced to convert the displacement of the member 47 by the uncompensated pressure into the desired displacement for the pilot spool of the servo device 153 (FIG. 8) to produce the desired ratio setting in the transmission 11. In addition to compensating for the displacement of the member 47, the adjustable connection 175 enables shifting the position of a pilot spool for a double acting servo unit 153 to give the desired ratio setting in either a forward or reverse direction as well as providing a neutral setting. The servo device or unit 153 is of a conventional design and is not illustrated in detail. In order to accomplish the direction control feature, the cam 170 has a second set of cam surfaces 176 which are a mirror image of the double acting cam surfaces 172 and a neutral set of cam surfaces formed by a center slot 177. When the follower 173 is on the cam surfaces 176, a reverse direction is produced for the pilot spool and the output of the servo device 153 controls the transmission ratio for a reverse direction from the direction produced by the follower 173 being on the surfaces 172. Shifting the follower 173 from one set of surfaces to the other set can only be accomplished when the engine 12 is at an idle setting and the follower 173 is at the junction of surfaces 172 and 176.

To control the shifting, a manual control lever 179 operates a valve member 180 in a valve housing 181 which receives a pressure line 182 and a vent line 183. The pressure line 182 is connected to pressure line 22 and the vent line 183 is connected to a vent line 184 which extends from the servodevice 153 back to the sump 28. The valve member 180 is a spool valve member having a pair of spool lands 185 and 186 which are spaced apart a distance slightly greater than the distance between the ports for lines 183 and 184.

The adjustable connection 175 has a cylinder 188 which receives a piston 189 which is connected to the rod 174. The piston 189 is biased to a center position by a pair of springs 190 and 191 to form a pair of pressure chambers 192 and 193. Chamber 192 is connected by a flexible conduit 194 to a port in the valve housing 181 which port is located between the ports for lines 182 and 183. Chamber 193 is connected by a flexible conduit 195 to a pair of spaced ports in the valve housing 181 which spaced ports have the ports for lines 182 and 183 and conduit 194 located therebetween. The housing 181 has a small bleed passageway 196 extending from adjacent the port for line 183 to the spool valve cylinder.

When the lever 179 is in the neutral position, the land 185 blocks the port of the pressure line 182 and land 186 is slightly clearing the port of vent line 183 so that fluid in line 194 is vented to the sump and any pressure in line 195 will be vented by passageway 196. If the speed of the engine is increased above the idle speed to move the cam 170 on the slide 171, the follower 173 would move along the center slot 177 and not impart any movement to the rod 174.

When the lever 179 is moved to the forward position, the lands 185 and 186 are shifted to connect pressure line 182 to line 194 and to vent line 195. Pressure applied to line 194 acts in chamber 192 to move piston 189 against spring 191 so that the follower 173 will be in the forward cam surfaces 172. As the speed of the engine increases, the follower moves between surfaces 172 and shifts the pilot spool of servo 153 to obtain forward transmission ratios. When the engine speed returns to idle, the follower 173 will be opposite the center slot 177 and the lever 179 can be shifted to the reverse position. When in reverse, the lands 185 and 186 are moved to interconnect pressure line 182 to line 195 to apply pressure in chamber 193 and chamber 192 is vented to vent line 183. With pressure in chamber 193, the piston 189 is shifted against spring 190 to shift the follower 173 into the reverse cam surface 176.

Operation of the control device 150 is substantially the same as the operation of the device 100 with the only difference being that the compensation of the output pressure from the gear pump 21 is accomplished by using a cam unit after utilizing the pressure to obtain displacement of the member 47 in response to the sensed conditions of load and speed for the engine 12. The action of the linkage bar 101 is exactly the same and allows opening of butterfly valve 49 even when portion 111 cannot pivot in a clockwise direction. As the speed of the prime mover 12 increases, the movement of the member 47 would shift the cam 170 to impart a signal to the pilot spool through the cam follower 173, 174 and the variable connecting joint 175.

Although minor modifications may be suggested by those versed in the art, it should be understood that I wish to employ within the scope of the patent granted hereon all such modifications as reasonably and properly come within the scope of my contribution to the art.

I claim:

1. A control device for a transmission having a variable displacement pump driven by a prime mover having a power curve and a hydraulic motor comprising: first means sensing the load applied on the prime mover; second means for sensing the speed of the prime mover including pump means driven by the prime mover for developing a hydraulic pressure proportional to the speed of the prime mover, and compensating means for correcting for change in hydraulic pressure from the pump means in response to speed changes of the prime mover to follow a pressure-speed curve which is substantially similar to the power curve of the prime mover up to a maximum horsepower of the prime mover; a servo device having a housing containing a cylinder, a servo piston disposed in the cylinder and a pilot spool for controlling the application of fluid pressure to the servo piston; linkage means connecting the servo piston with the hydrostatic transmission to vary the ratio of the transmission in response to movement of the servo piston; and means for combining the output of the first and second sensing means for applying a control signal to the pilot spool whereby the ratio of the hydrostatic transmission is varied in response to changes in both the load and speed of the prime mover.

2. A control device according to claim 1, which further includes a manually operated direction control device for receiving the output of the servo piston and producing the desired output for driving the hydrostatic transmission in both a forward and reverse direction.

3. A control device according to claim 1, wherein the first sensing means senses changes in the vacuum at the intake manifold of the prime mover to sense the changes of load thereon.

4. A control device according to claim 3, wherein said first means comprises a conduit extending from the intake manifold of the prime mover to a first pressure chamber, said conduit having a valve connected to a valve actuating means for opening and closing the valve to regulate flow in the conduit, said actuating means including a spring for urging the valve closed and a piston acted on by the pressure from the pump means to open the valve, a diaphragm separating the first pressure chamber from a second pressure chamber which is vented to the atmosphere and a restricted orifice interconnecting said first and second chambers, and wherein said means for combining includes a member connected to said diaphragm and having a piston disposed in a pressure chamber which receives the pressure from the pump means to act on the piston and to move the member in one direction and a spring resisting movement of the member in said one direction so that the member is moved by the pressure differential in the first and second chambers and by the piston in the one direction against the force of the spring.

5. A control device according to claim 4, wherein the compensating means of the second sensing means includes a cam and follower, said follower being connected to the pilot spool and the cam being connected to the member of the means for combining the output of the first and second sensing means so that movement of the follower on the cam causes shifting of the pilot spool with compensation for correcting the changes in the hydraulic pressure from the pump means to follow a pressure speed curve which is substantially similar to the power curve of the prime mover.

6. A control device according to claim 5, wherein the member is interconnected to the cam by a linkage including a lever bar, said lever bar having a pivotal connection at another point to the throttle linkage of the prime mover so that the bar is pivoted in response to changes in the throttle setting.

7. A control device according to claim 4, wherein said compensating means of the second sensing means is disposed adjacent to the output of the pump means and includes pressure release means for bleeding-off a variable portion of the pressure from the output of the pump means through an orifice with the effective size of the orifice varying in response to changes in the output of the pump means whereby the output pressure of the pump means is corrected to provide a modified pressure for acting on the piston of the valve actuating means and the piston of said member.

8. A control device according to claim 7, wherein the bleed means includes a cup-shaped piston received in a cylinder, said cup-shaped piston having at least one bleed orifice having an effective orifice opening depending on the displacement of the cup-shaped piston in the cylinder, means biasing the cup-shaped piston to close the bleed orifice and means applying the output pressure to the cup-shaped piston to displace it against said biasing means.

9. A control device according to claim 7, which includes a lever bar pivotally mounted on a fixed support at a first point, the pilot spool and the member each being pivotally connected to the lever bar at points spaced from said one point and said bar providing a pivot point for a throttle linkage for the prime mover at a point spaced from said other points, so that movement of the bar by the member causes changes in the throttle setting of the prime mover.

10. A control device according to claim 7, which includes a lever bar having a first portion connected to a second portion by a pivotal connection, said member and pilot spool having pivot connections with the first portion at separate points thereon, said second portion being a pivotal link in a linkage between a manually actuated throttle and a throttle valve so that during initial setting of the manually actuated throttle, the second portion pivots with respect to the first portion and as the prime mover assumes the speed for its throttle setting, the first portion pivots to a straight line relationship with the second portion as the member shifts the pilot spool.

11. A control device for a transmission having a variable displacement pump driven by a prime mover having a power curve, said transmission including a hydraulic motor, comprising: first means for sensing the load on the prime mover and providing a signal; second means for sensing the speed of the prime mover including pump means driven by the prime mover to provide a hydraulic pressure and means for bleeding the pressure of the output of the pump means in varying amounts depending on the speed of the prime mover to provide a modified pressure as a signal, said modified pressure having a curve for speed versus pressure resembling the power curve of the prime mover up to a point of maximum power; means combining the signal of the first means and the modified pressure to form a combined signal for the two sensing means; a servo device having a housing containing a cylinder, a servo piston disposed in the cylinder and a pilot spool for controlling the application of the fluid pressure to the servo piston; linkage means connecting the servo piston with the transmission to vary the ratio of the transmission in response to the movement of the servo piston; and linkage means interconnecting the pilot spool to the means for combining so that the pilot spool is moved in response to the combined signal.

12. A control device according to claim 11, which further includes manually actuated direction control means interposed between the output of the servo piston and the hydrostatic transmission to vary the output signal in response to selected forward and reverse drive of the vehicle.

13. A control device according to claim 11, wherein the means for combining the signals from the first and second sensing means includes a member shifted in response to the combined signal and wherein the linkage interconnecting the pilot spool and the means includes a bar pivotally connected to a fixed support, said bar having pivotal connections to the pilot spool and the member at spaced points from the fixed support and also providing a pivot point in a linkage between the manually actuated throttle and the throttle of the prime mover so that movement of the bar in response to the combined signal causes changes in the throttle setting of the prime mover.

14. A control device according to claim 11, wherein the means for combining the signal has a member movable in response to the combined signal, wherein the linkage interconnecting the means for combining to the pilot spool includes a lever bar having a first portion pivotally connected to a second portion with means biasing the two portions into a straight line arrangement, said pilot spool being pivotally connected to the first portion at a first point and said member being connected at a second point to the first portion by a pivotal connection spaced from the first point, a manually actuated throttle being pivotally connected to the second portion at a third point and a linkage system extending to the throttle of the prime mover pivotally connected at a fourth point on the second portion spaced from the third point so that said second portion acts as a link in a linkage therebetween, whereby during initial acceleration the second portion pivots relative to the first portion until the sensed modified pressure increases at which time the first portion moves relative to the second portion to cause movement of the pilot spool and when the first portion is in line with the second portion, further movement due to the combined signal causes variations in the output of the servo piston and changes in the throttle setting of the prime mover.

15. A control device according to claim 14, wherein the first and second portion of the bars are provided with a lost motion connection therebetween to limit the pivotal movement therebetween.

16. A control device according to claim 14, wherein said first sensing means senses changes in the vacuum at the intake manifold of the prime mover and includes a conduit extending from the intake manifold of the prime mover to a first pressure chamber, said conduit having a valve connected to a valve actuating means for opening and closing the valve to regulate flow in the conduit, said actuating means including a spring for urging the valve closed and a piston acted on by the modified pressure to open the valve, a diaphragm separating the first pressure chamber from a second pressure chamber which second pressure chamber is vented to the atmosphere, and a restricted orifice interconnecting the first and second chambers, wherein said member of the means for combining is provided with a piston for receiving modified pressure and is connected to the diaphragm and wherein said means for combining further includes a spring for opposing movement of said member in one direction so that application of the modified pressure and the pressure differential between the first and second chambers causes movement against said spring in said one direction.

17. A control device according to claim 16, wherein the spring of the valve actuating means is bottomed between the piston of the valve actuating means and an adjustment device to enable changing of the compression on the spring to vary the spring loading on the valve member.

18. A control device according to claim 17, wherein the adjustment means includes a plunger bottomed on the spring of the actuating means and engaging a rotatable cam, said cam being rotated by linkage attached to the manually actuated throttle so that the spring pressure is increased as the throttle is returned to the idle position to ensure positive closing of the valve when the prime mover is in an idle condition.

19. A control device according to claim 16, which further includes temperature responsive means for compensating the fluid pressure from the pump means in response to the increase in temperature of the hydraulic fluid.

20. A control device according to claim 16, wherein the linkage means between the servo piston and the transmission includes means for changing the direction of displacement of the servo piston to enable change in the ratio of transmission for both a forward and reverse direction.

* * * * *